United States Patent [19]

Hafele

[11] Patent Number: 4,552,526
[45] Date of Patent: Nov. 12, 1985

[54] BLOW MOLDING MACHINE WITH MOLD SHUTTLE STRUCTURE

[75] Inventor: Robert X. Hafele, Baton Rouge, La.

[73] Assignee: Hoover Universal, Inc., Ann Arbor, Mich.

[21] Appl. No.: 514,435

[22] Filed: Jul. 18, 1983

[51] Int. Cl.[4] .............................................. B29D 23/03
[52] U.S. Cl. .................................... 425/522; 425/532; 425/533; 425/534; 425/537; 264/536; 264/542
[58] Field of Search ................ 264/536, 542; 425/522, 425/532, 533, 534, 537, 541

[56] References Cited

U.S. PATENT DOCUMENTS 3,910,741 10/1975 Mehnert .............................. 425/534
3,944,642 3/1976 Uhlig .................................... 264/296
3,972,669 8/1976 Mehnert .................... 425/DIG. 211

*Primary Examiner*—Peter Kratz
*Assistant Examiner*—Timothy W. Heitbrink
*Attorney, Agent, or Firm*—Stephenson and Boller

[57] ABSTRACT

Blow molding apparatus for manufacturing containers, the apparatus having a blow station, a parison forming station to one side of the blow molding station, a container trim station at the other side of the blow molding station and a multiple station mold carrying slide for shuttle movement between a first position below the parison forming and blow molding stations and a second position below the blow molding and trim stations. The shuttling movement of the slide takes place between a pair of movable platens that are capable of opening and closing the molds. Improved structure in the apparatus insures that the blow heads will not separate from the molds during blowing, provides for trimming of the containers at the trim stations and for deposit of trimmed containers in upright positions on a conveyor.

4 Claims, 8 Drawing Figures

BLOW MOLDING MACHINE WITH MOLD SHUTTLE STRUCTURE

This invention relates generally to blow molding machines and more particularly to blow molding apparatus for manufacturing containers wherein the apparatus has a blow molding station, a parison forming station to one side of the blow molding station, a container trim station at the other side of the blow molding station, and a two station mold carrying frame mounted for shuttle movement between a first position below the parison forming and blow molding stations and a second position below the blow molding and trim stations. The machine can also be provided with a second two station mold carrying frame which shuttles back and forth in unison with the first frame to enable continuous extrusion at the parison forming station.

This application discloses blow molding apparatus which is an improvement over my prior application Ser. No. 348,730 filed Feb. 16, 1982 entitled "Molding Method and Apparatus" now U.S. Pat. No. 4,468,368 issued Aug. 28, 1984.

The improved apparatus of this invention includes tie rods on which mold supporting platens are mounted for opening and closing the molds. The blow heads and the molds are both supported directly on the tie rods so that in response to a downward force on the blow head urging it into engagement with the mold during blowing of a container, no reaction movements are generated which tend to separate the blow head and the mold. Furthermore, the apparatus of this invention provides for secondary operations such as trimming of the molded containers at another station to which the containers are directed after they have been blow molded. This enables construction of the mold with thick walls which can be cooled, thereby eliminating any necessity for a mold with a thin bottom wall to facilitate trimming, for example, at the blow station. A two-position chute at the trim station directs the tails or flash that have been removed from the containers to one position and directs the finished containers to a conveyor.

Container gripping and release mechanism at the trim station supports the containers during trimming and releases the finished containers for guided downward travel onto a conveyor. The result is improved blow molding apparatus in which the mold carrying frames are shuttled transversely between parison forming, blow molding, and trim stations and platens are mounted on tie rods that are located in fixed positions on the frame so that the platens can move at right angles to the shuttling movement of the mold carrying frame. This eliminates the necessity for moving the mold opening and closing mechanism back and forth between the various stations thereby promoting overall efficiency of the blow molding apparatus.

Further objects, features, and advantages of this invention will become apparent from a consideration of the following description, and the appended claims when taken in connection with the accompanying drawing in which:

Figure 1:
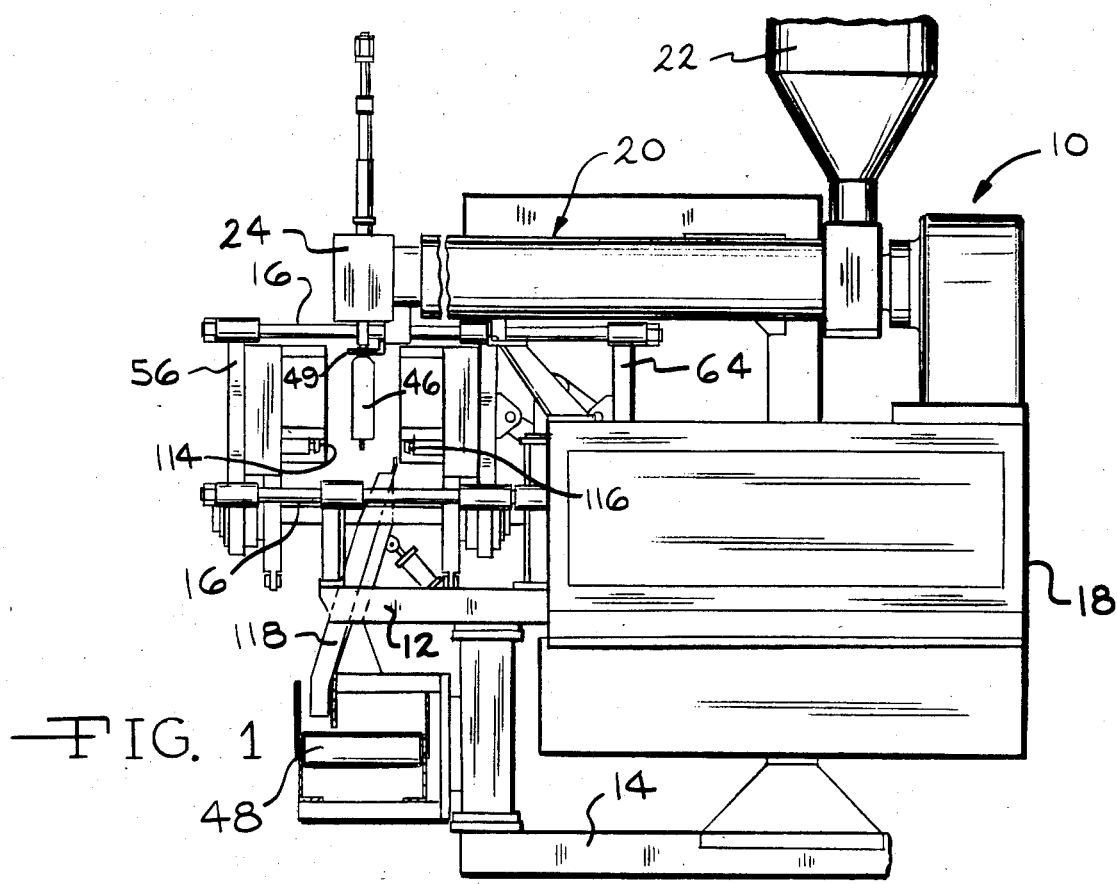
FIG. 1 is a side elevational view of the blow molding apparatus of this invention, showing a two-position chute in the apparatus in position for directing containers formed in the apparatus onto a conveyor.

With reference to the drawing, the blow molding apparatus of this invention, indicated generally at 10, is shown in FIG. 1 as including a main frame 12 which includes a base 14, a plurality of horizontal tie rods 16 which extend in a direction fore and aft of the frame 12 and a stand 18 for a conventional extruder 20 which is also generally horizontal, has an inlet hopper 22, and supplies plastic in a molten form to a die or extruder head 24.

Figure 4:
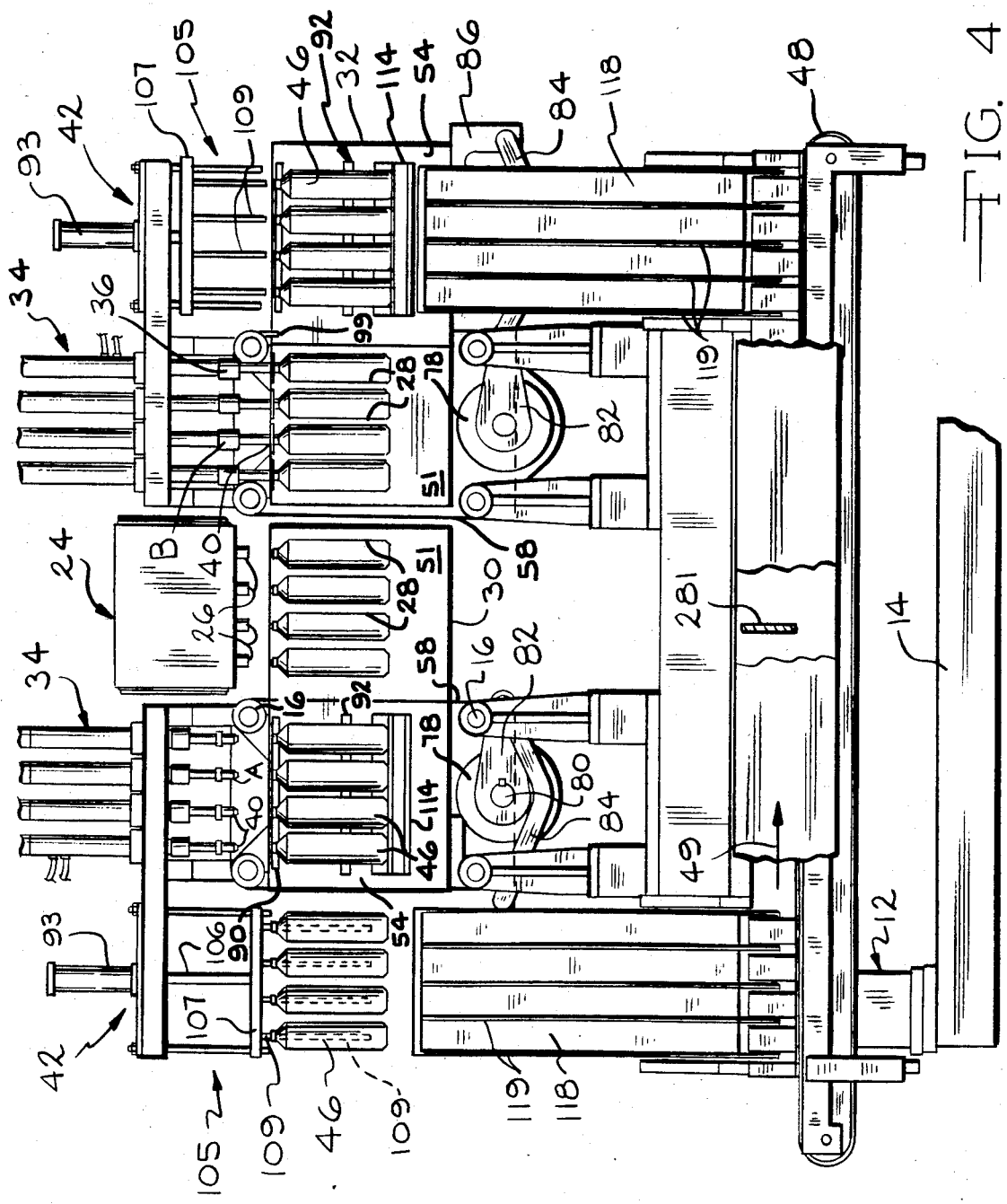
FIG. 4 is a front elevational view of the blow molding apparatus of this invention, with some parts removed for the purpose of clarity.

As shown in FIG. 4, the extruder head 24 has four downwardly directed discharge nozzles 26 through which conventional downwardly extending parisons are extrudable for eventual containment within a plurality of upright side-by-side mold cavities 28 on a mold carrying frame 30 or 32, there being two horizontally movable frames in the apparatus of this invention. Each frame 30 and 32 carries a set of mold cavities 28, each set consisting of a group of four cavities, but it is to be understood that it is within the purview of this invention to provide any desired number of groups of mold cavities 28 on each frame.

The extruder station 24 is flanked on both sides by blow stations 34 which are substantially identical and each of which includes a plurality of blow heads 36. Each head 36 (FIG. 3) is mounted on a main frame portion 37 that is firmly secured to a pair of tie rods 16. Each head 36 is supplied with blowing fluid and is movable between an elevated position shown at A in FIG. 4 spaced above the mold frames 30 and 32 and a lower blow position indicated at B in which the blow nozzles 40 on the lower ends of the heads 36 project into parisons in the mold cavities 28 for blowing the parisons into conformity with the mold cavities to form containers as is well known in the art.

The blow stations 34 are flanked on opposite sides by trim stations 42, each of which includes structure for trimming containers that have been blown at the adjacent blow station 34. The trimmed containers are subsequently discharged from the stations 42 as finished containers. It is to be noted that in the preferred form of the invention, there are four discharge nozzles 26 at the parison forming station 24 spaced apart predetermined equal horizontal distances. There are also four blow nozzles 40 at each of the blow stations 34 that are spaced apart the same distance as the nozzles 26. Similarly, there is provision for supporting four containers at each trim station 42 for supporting four containers spaced apart the same distances as the heads 26 and 40.

In the operation of the apparatus 10, assume that the mold carrying frames 30 and 32 are in the positions shown in FIG. 4. In these positions, the four mold cavities 28 at the right end of the frame 30 contain parisons extruded from the head 24. At the left end of the frame 30 are blown plastic containers 46 that have been removed from the nozzles 40, which have in turn been moved upwardly to their elevated positions A. The mold frame 32 is in a position in which the cavities 28 at the left end thereof contain parisons that are in the process of being blown into conformity with the mold cavities 28 to form the desired containers, and for this purpose, the blow nozzles 40 are in their lower positions. Four previously blown containers at the right hand end of the frame 32 are being trimmed. Containers 46 that were previously blown and trimmed are about to be released from the trim station 42 to the left of the mold frame 30 for downward movement onto a conveyor 48 (movable in the direction of arrow 49) disposed below the mold frames 30 and 32.

The containers 46 at the left end of the mold frame 30 are next released and both of the mold frames are successively shuttled to the left as viewed in FIG. 4. The frames 30 and 32 are then in the reverse positions described above and the above described cycle is then repeated continuously for as long as container production is required.

Figure 2:
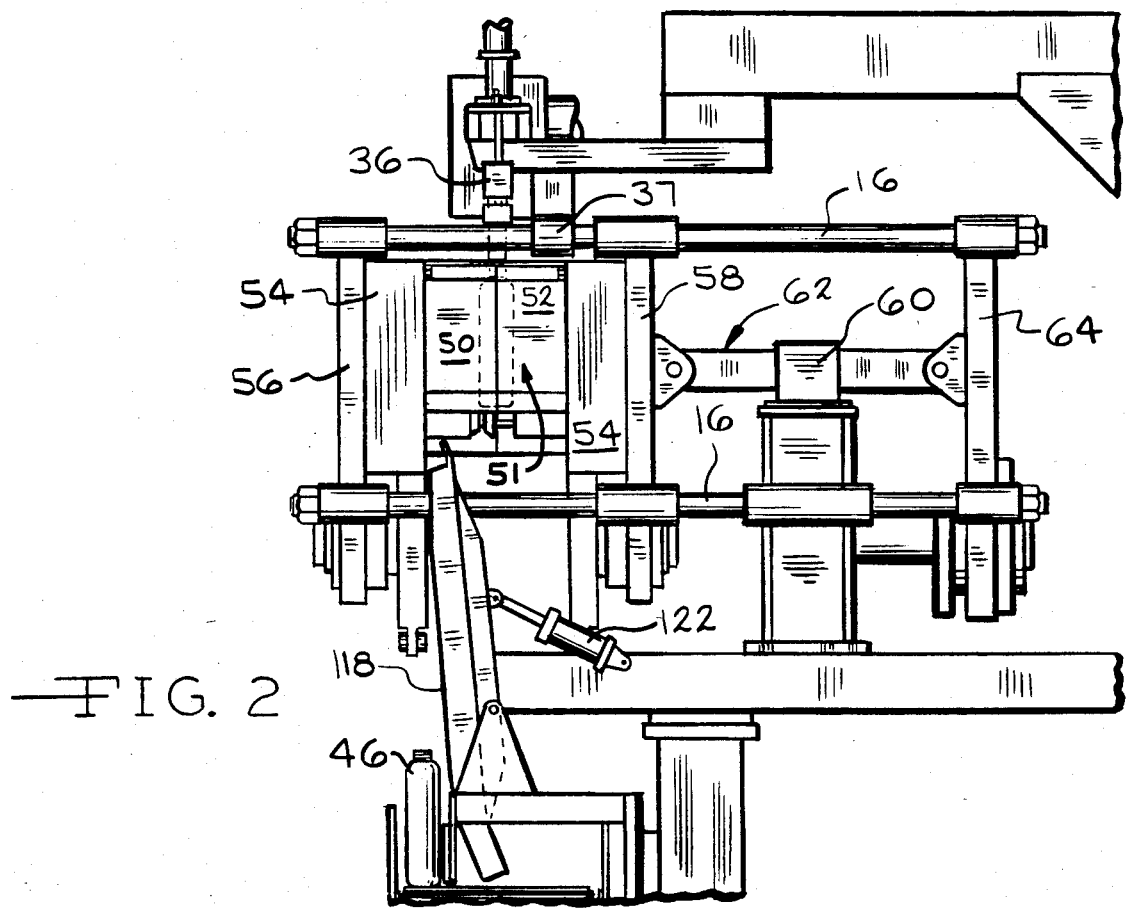
FIG. 2 is an enlarged fragmentary elevational view of a portion of the blow molding apparatus shown in FIG. 1, showing the chute in a second position for receiving flash removed from containers that have been molded in the apparatus of this invention.
Figure 3:
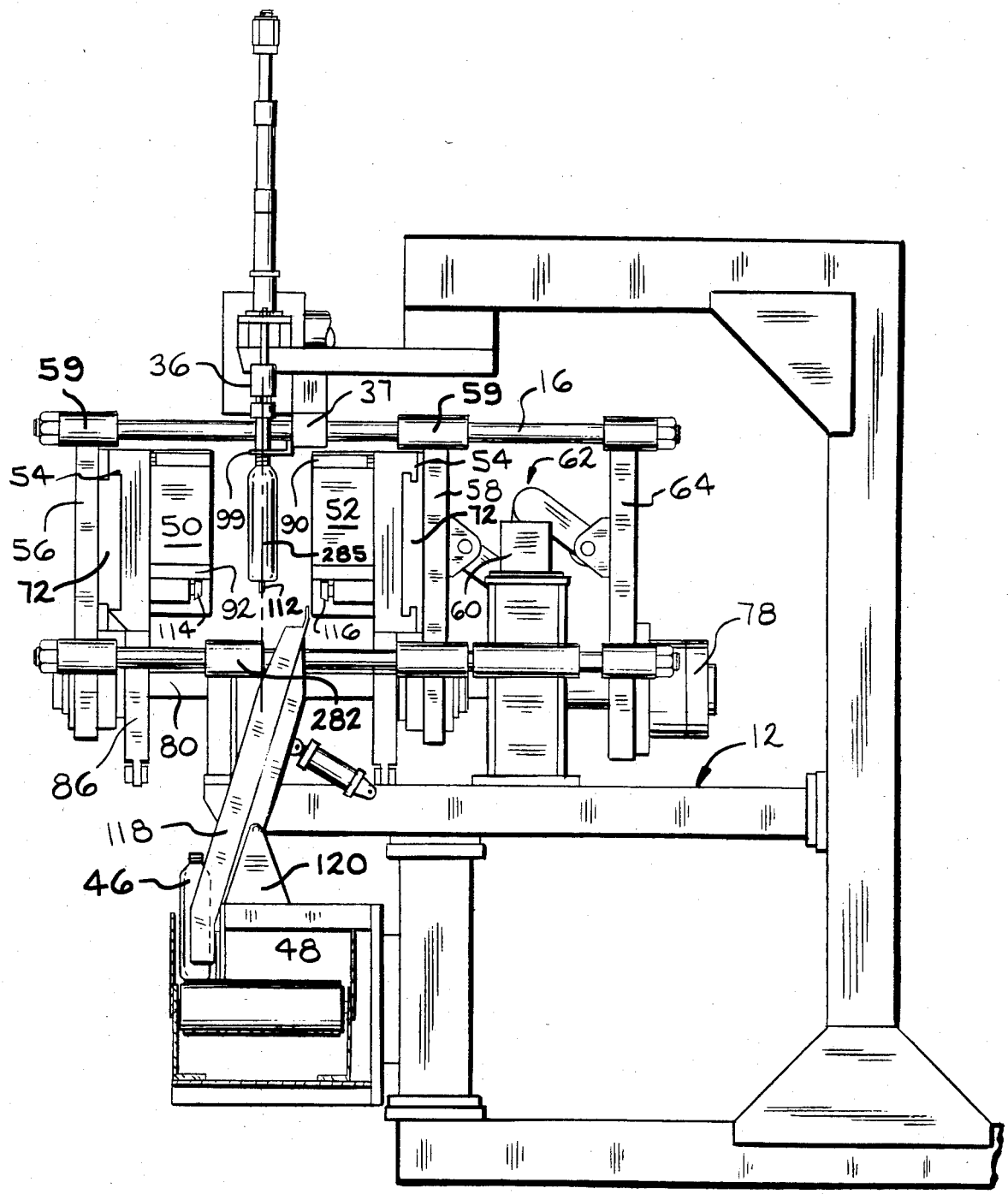
FIG. 3 is an enlarged elevational view of a portion of the apparatus of this invention.

As shown in FIGS. 1-4, each of the mold frames 30 and 32 supports a mold 51 which contains the cavities 28 and consists of a pair of mold halves 50 and 52 which are movable horizontally to the spaced apart positions shown in FIG. 3 to open the mold and in opposite directions to tightly engaged positions (FIG. 2) to close the mold. Each of the mold halves 50 and 52 is firmly mounted on a mold support slide 54 (which forms a part of a mold support frame 30 or 32) which is secured to one of two platens 56 and 58 mounted on the tie rods 16 by means of tubular members 59. A hydraulic drive mechanism 60 is connected to a toggle mechanism 62 the opposite ends of which are in turn connected to the platen 58 and a third platen 64. The tie rods 16 are secured at their ends to the platens 56 and 64 and extend through the tubular members 59 secured to the platen 58. As a result, when the toggle mechanism 62 is in the folded position shown in FIG. 3, the platens 56, 58 are moved to positions in which the mold halves 50 and 52 are spaced apart.

When the toggle mechanism is moved to the extended position shown in FIG. 2, the platens 56 and 58 are moved to positions in which the mold halves 50 and 52 are tightly engaged and the mold is closed.

Figure 5:
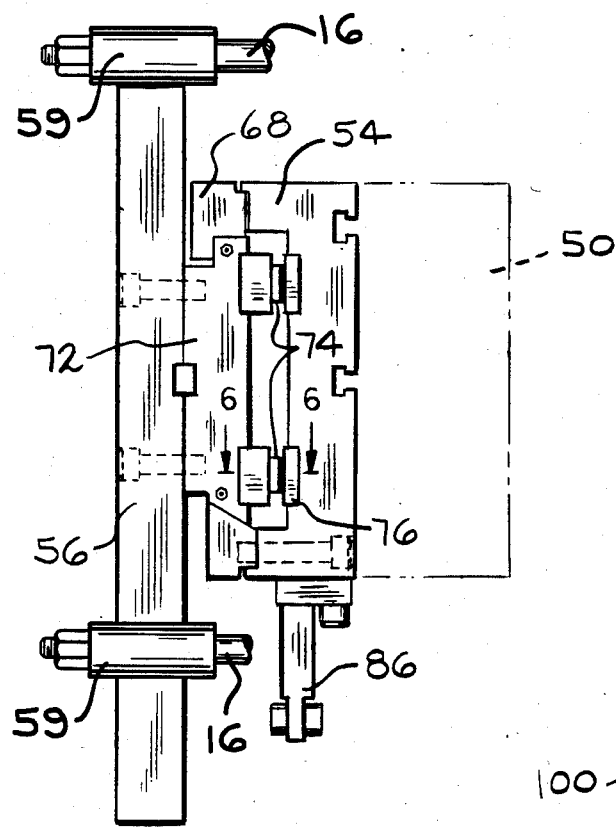
FIG. 5 is a fragmentary detail view of a portion of the mold carrying frame that shuttles between two positions in the blow molding apparatus of this invention.
Figure 6:
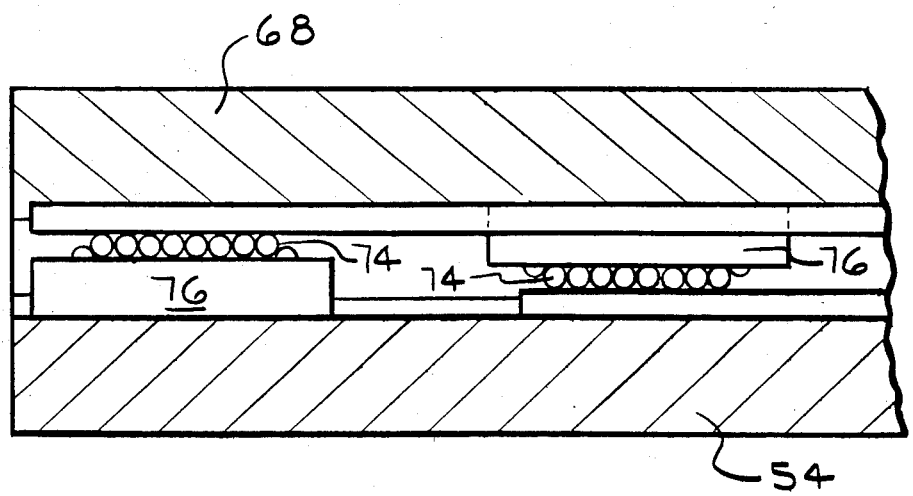
FIG. 6 is an enlarged detailed view of a portion of the structure shown in FIG. 5, as viewed from substantially the line 6—6 in FIG. 5.

FIGS. 5 and 6 illustrate the mounting of a mold support slide 54 on a supporting platen, in this case, the platen 56. The slide 54 is slidably mounted by means of an upper slide block 68 and a lower slide wedge 70 on a guide member 72 bolted to the platen 56. To facilitate sliding movement of the slide 54 on the guide member 72, a plurality of upright cylindrical roller bearings 74 are confined between retainers 76 carried by the slide 54 and the guide member 72. Thus, the mold slides 54 are freely slidable in horizontal directions between the platens 56 and 58 in both the mold open and mold closed positions of the platens 56 and 58 shown in FIGS. 2 and 3.

For moving the mold frames 30 and 32, a pair of hydraulic motors 78 (FIGS. 3 and 4) are provided. Each of the motors 78 drives a drive shaft 80 which is parallel to the tie rods 16 and is secured at its outer end to an actuating lever 82 which is in turn pivotally connected to one end of an irregularly shaped actuator bar 84 that is pivotally secured at its opposite end to a mounting plate 86 secured to a slide 54.

When the actuator 78 is operated to move the arm 82 corresponding to the frame 30 to the position shown in FIG. 4, the mold frame 30 is in a position directly below the extruder station 24 and the blow station 34 to the left thereof as viewed in FIG. 4. When the arm is moved 180° to a position corresponding to the position of the arm 82 for the frame 32, the mold frame 30 is moved to a position directly below the stations 34 and 42. The mold frame 32 is similarly moveable in shuttle fashion between two corresponding positions on the opposite side of the extruder head 24.

Figure 7:
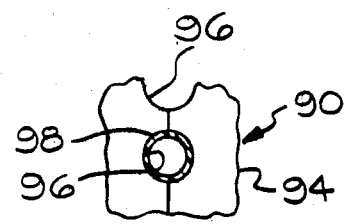
FIGS. 7 & 8 are fragmentary sectional views of the container support structure at a trim station in the blow molding apparatus of this invention.
Figure 8:
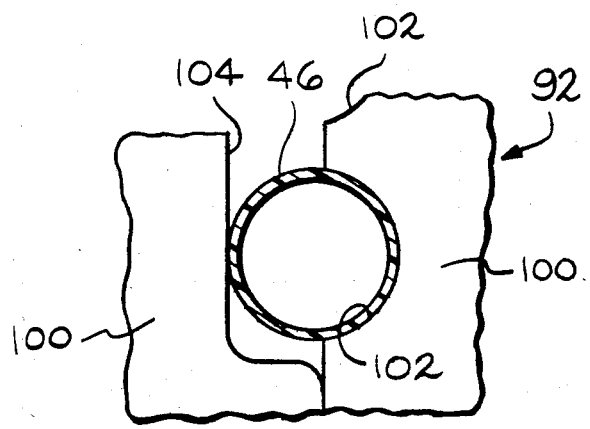

At the trim stations 42, the containers are held in the upright positions shown in FIG. 4 for trimming by upper and lower clamp assemblies 90 and 92 (FIGS. 7 and 8) mounted on the mold frame slides 54. The upper assembly 90 consists of opposing plates 94, each with four arcuate recesses 96 which mate when the platens 56 and 58 are moved toward each other to grip the necks 98 of the containers 46 at the trim station 42.

The assembly 92 likewise consists of clamp plates 100 which are mounted on the slides 54 and engage opposite sides of the body of the container 46 when the platens are moved toward each other. One plate 100 has arcuate recesses 102 and the other plate 100 has a straight edge 104 which engages the container 46.

Container guide units 105 are provided at each trim station 42 for directing finished containers 46 away from the station. Each unit 105 includes an operating cylinder assembly 93 mounted on the main frame 12 and having a downwardly extending piston rod 106 secured to a horizontal plate 107 guidably mounted for up and down movement on guide rods 108 carried by the main frame 12.

Long slide rods 109 extend downwardly from the plate 107 in line with containers 46 to be trimmed at the station 42. During trimming of containers, the fluid actuated cylinder assembly 93 is operated to move the plate 107 downardly to in turn move the rods 109 into the containers 46 extending to positions near the bottoms of the containers.

When the platens 56 and 58 are moved apart, the clamp units 90 and 92 release the containers 46 and they slide downwardly on the rods 109 onto a take out chute 118. The rods 109 are long enough to guide the bottles 46 until they touch the chute 118.

In operation of the apparatus at the trim station 42, the containers 46 are maintained in positions between the mold slides 54, as illustrated in FIG. 3, until they have been trimmed by removal of tails or flash 112 on the lower ends thereof. The necks 98 of the containers 46 are trimmed by movement past a main frame mounted doctor blade 99 (FIGS. 3 and 4) during transfer of the containers to a trim station 42. The blade 99 cuts or scrapes a cut or nearly cut moil from the tops of the containers 46 as the containers are shuttled from blow stations 34 to trim station 42 and while the containers are being held by the clamp assemblies 90 and 92. The scrap that is removed from the containers is directed onto the conveyor 48. Following removal of the tails 112, the containers 46 are released for travel downwardly onto the conveyor 48.

A tail removal assembly is mounted on each of the mold support frames 30 and 32 and comprises a yieldable stop 114 mounted on one of the slides 54 in the frame and a plunger actuated tail remover 116 mounted on the other slide. As shown in FIG. 2, when a mold 51 is closed at a trim station 42, the plunger actuated tail remover 116 is extended to engage the tail 112 and tear or shear it off the bottom wall of the container 46. The extension of tail remover 116 causes the stop 114 to recede with the removed tail clamped between the members 114 and 116. As soon as the plunger 116 is returned, the tail 112 is released and drops downwardly into the chute 118 that is pivotally mounted on a support 120 carried by the main frame 12.

A hydraulic cylinder assembly 122 pivotally mounted on and extending between the main frame 12 and the chute 118 is operable to move the chute from its tail receiving position shown in FIG. 2 to its bottle receiving position shown in FIG. 3. In the FIG. 3 position of the chute 118, bottles falling downwardly from the trim station 42 are directed onto the conveyor 48 at a position spaced from the position in which the removed tails 112 are deposited. When the chute 118 is in the FIG. 3 position, the trimmed containers 46 deposited on the conveyor 48 cannot move with the conveyor because they are restrained by the side walls 119 of the chute 118 which define a plurality of parallel paths 120 corresponding in number to the number of containers 46 at a trim station. When the chute 118 is actuated to move it to the scrap receiving position (FIG. 2), the bottles 46 are released so they can move with the conveyor 48. The chutes 118 move in unison and carry a stop 281 to prevent containers 46 from one trim station 42 interfering with the deposit of containers from the other trim station 42 on the conveyor 48.

From the above description, it is seen that this invention provides improved blow molding apparatus which is readily operable to efficiently produce finished containers 46 which, because they are trimmed and directed in upright positions by the chute 118 onto the conveyor 48, can readily be loaded into cartons or other transport containers. The mold frames 30 and 32 are sometimes shuttled between stations when the molds are open and other times when the molds are closed, the hydraulic nature of the platen moving motor 60 enabling adjustment of the mold closing pressure to facilitate shuttling. For example, when frame 30 is moved to the left from its FIG. 4 position, the mold halves 50, 52 are closed, but when the frame 32 is shuttled to the left from its FIG. 4 position, the mold thereon is open. The mounting of both the blow heads 36 and the mold frames 30 and 32 on the tie rods 16, which are part of main frame 12, insures against separation of the molds from the blow heads during blowing. The provision of bearings 282 (FIGS. 1 and 3) on the main frame 12 supporting the lower tie rods 16 at positions overlapping the center line 285 of blow head 36 and mold 51 so that the bearings 282 are substantially vertically aligned with the head 36 and mold 51 further insures against separation of head and mold.

In the illustrated embodiment of the invention, each of the mold frames 30 and 32 encompasses two of the stations 24, 34 and 42 for progressively shuttling work through the stations. It is apparent, however, that it is within the purview of this invention to make the frames of any desired size spanning any desired number of stations, not just the two that are shown, for progressively shuttling work, such as parisons, preforms, containers, etc., through any desired number of stations, one station at a time.

What is claimed is:

1. In blow molding apparatus for manufacturing containers wherein said apparatus has a blow molding station, a parison forming station to one side of said blow molding station, a container trim station at the other side of said blow molding station, parallel tie rods, platens mounted on said tie rods for movement toward and away from each other and multiple station mold carrying slides mounted on said platens for shuttle movement between a first position below said parison forming and blow molding stations and a second position below said blow molding and trim stations; at least one blow head at said blow molding station operable to be moved downwardly into engagement with a mold on said slides for blowing a parison in said mold to a configuration forming a container in said second position of said slides, and means directly supporting said blow head on at least one of said tie rods to provide for a common support of said mold and said blow head on said tie rods so that in response to downward movement of said blow head into engagement with said mold no reaction movements are generated tending to separate said blow head and said mold.

2. Blow molding apparatus according to claim 1, wherein said tie rods include upper and lower tie rods and said blow head is mounted on at least one of the upper tie rods.

3. Blow molding apparatus according to claim 2 further including bearing means supporting said mold carrying slides on said platens for said shuttling movement.

4. Blow molding apparatus according to claim 3 wherein said apparatus includes a main frame and a tie rod support bearing on said main frame in substantial vertical alignment with said blow head and said mold.

* * * * *